United States Patent
Nishimura et al.

(10) Patent No.: US 10,427,696 B2
(45) Date of Patent: Oct. 1, 2019

(54) METHOD OF PRODUCING PLATE SPRING FOR RAILCAR BOGIE

(71) Applicant: KAWASAKI JUKOGYO KABUSHIKI KAISHA, Hyogo (JP)

(72) Inventors: Takehiro Nishimura, Kobe (JP); Shunichi Nakao, Kobe (JP); Tomohei Kobayashi, Akashi (JP); Yousuke Tsumura, Kobe (JP); Mamoru Nishio, Akashi (JP); Daisuke Watanabe, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 134 days.

(21) Appl. No.: 14/912,717

(22) PCT Filed: Oct. 6, 2014

(86) PCT No.: PCT/JP2014/005083
§ 371 (c)(1),
(2) Date: Feb. 18, 2016

(87) PCT Pub. No.: WO2015/052912
PCT Pub. Date: Apr. 16, 2015

(65) Prior Publication Data
US 2016/0200328 A1     Jul. 14, 2016

(30) Foreign Application Priority Data

Oct. 9, 2013    (JP) ................... 2013-212122

(51) Int. Cl.
*B61F 5/30*      (2006.01)
*F16F 1/368*      (2006.01)

(52) U.S. Cl.
CPC ............. *B61F 5/30* (2013.01); *B61F 5/302* (2013.01); *F16F 1/368* (2013.01)

(58) Field of Classification Search
CPC ... B61C 9/50; B65H 18/28; C61F 5/30; C62F 5/302; F16F 1/18
See application file for complete search history.

(56) References Cited

U.S. PATENT DOCUMENTS

| | | |
|---|---|---|
| 3,968,958 A | 7/1976 | Huchette et al. |
| 4,688,778 A | 8/1987 | Woltron |

(Continued)

FOREIGN PATENT DOCUMENTS

| | | |
|---|---|---|
| EP | 0 005 916 A1 | 12/1979 |
| GB | 2 021 731 A | 12/1979 |

(Continued)

OTHER PUBLICATIONS

Written Opinion of PCT/JP2014/005083 dated Nov. 11, 2014.

(Continued)

*Primary Examiner* — David P Bryant
*Assistant Examiner* — Lee A Holly
(74) *Attorney, Agent, or Firm* — Studebaker & Brackett PC

(57) ABSTRACT

A method of producing plate springs for a railcar bogie, the plate springs each extending in a car longitudinal direction and elastically supporting a cross beam while being supported by an axle box in the railcar bogie, the axle box accommodating a bearing for an axle, the method includes: a molding step of molding a mother plate made of fiber-reinforced resin, the mother plate including a layer made of continuous fibers oriented in a first direction when viewed from a normal direction of a main surface of the mother plate; a cut position determining step of determining positions of a plurality of parallel cut lines for cutting the mother plate along the first direction; and a cutting step of cutting the mother plate along the plurality of cut lines to take out the plate springs made of the fiber-reinforced resin.

3 Claims, 6 Drawing Sheets

(56) References Cited

U.S. PATENT DOCUMENTS

| | | | | |
|---|---|---|---|---|
| 2010/0162865 A1* | 7/2010 | Innocenzo | ............ | B65H 18/28 83/73 |
| 2011/0114252 A1* | 5/2011 | Partington | ............ | B29C 70/44 156/157 |
| 2012/0279416 A1* | 11/2012 | Nishimura | ............... | B61C 9/50 105/218.1 |
| 2014/0162518 A1* | 6/2014 | Shimizu | ................... | C08J 5/24 442/175 |

FOREIGN PATENT DOCUMENTS

| | | | | |
|---|---|---|---|---|
| JP | S54-158562 A | 12/1979 | | |
| JP | S55-054737 A | 4/1980 | | |
| JP | S55-126424 A | 9/1980 | | |
| JP | WO 2013015299 A1 * | 1/2013 | ............... | C08J 5/24 |
| WO | 2013/008468 A1 | 1/2013 | | |
| WO | 2013/038673 A1 | 3/2013 | | |

OTHER PUBLICATIONS

International Preliminary Report on Patentability of the International Searching Authority; PCT/JP2014/005083 dated Apr. 12, 2016.

International Search Report of PCT/JP2014/005083 dated Nov. 11, 2014.

The extended European search report issued by the European Patent Office dated May 29, 2017, which corresponds to European Patent Application No. 14851656.0-1754 and is related to U.S. Appl. No. 14/912,717.

\* cited by examiner

METHOD OF PRODUCING PLATE SPRING FOR RAILCAR BOGIE

TECHNICAL FIELD

The present invention relates to a method of producing a plate spring for use in a bogie of a railcar, the plate spring being made of fiber-reinforced resin.

BACKGROUND ART

A railcar is provided with a bogie for supporting a carbody of the railcar and allowing the railcar to run along a rail. In a general bogie, axle boxes each configured to accommodate a bearing for supporting a wheelset are supported by axle box suspensions so as to be displaceable relative to a bogie frame in an upper/lower direction. The bogie frame includes a cross beam extending in a lateral direction and a pair of left and right side sills extending from both respective end portions of the cross beam in a forward/rearward direction. The axle box suspension includes axle springs constituted by coil springs each provided between the axle box and the side sill located above the axle box.

On the other hand, PTL 1 proposes a bogie including a bogie frame from which side sills are omitted. Instead of the axle box suspensions and the side sills, the bogie of PTL1 is provided with plate springs extending in a car longitudinal direction and made of fiber-reinforced resin. Both forward/rearward direction end portions of each of the plate springs are supported by the axle boxes, and forward/rearward direction middle portions of the plate springs support both respective car width direction end portions of the cross beam from below. According to this, since the side sills are omitted from the bogie frame, the bogie frame is reduced in weight, and assembly work is simplified.

Citation List

Patent Literature

PTL 1: International Publication No. 2013/008468

SUMMARY OF INVENTION

Technical Problem

A typical method of producing the plate springs made of the fiber-reinforced resin is to individually mold the plate springs one by one. However, according to such molded product made of the fiber-reinforced resin, there is a possibility that a pressure distribution in a molding cavity during molding becomes nonuniform at a cavity end portion. If a nonuniform portion is formed at an end portion of the plate spring that is the molded product made of the fiber-reinforced resin, properties of the end portion of the plate spring become unstable, and this may influence on the performance, life, and the like of the plate spring.

An object of the present invention is to improve producibility of the plate spring made of the fiber-reinforced resin and to improve the performance, life, and the like of the plate spring.

Solution to Problem

A method of producing a plate spring for a railcar bogie according to the present invention is a method of producing plate springs, the plate springs each extending in a car longitudinal direction and elastically supporting a cross beam while being supported by an axle box in the railcar bogie, the axle box accommodating a bearing for an axle, the method including: a molding step of molding a mother plate made of fiber-reinforced resin, the mother plate including a layer made of continuous fibers oriented in a first direction when viewed from a normal direction of a main surface of the mother plate; a cut position determining step of determining positions of a plurality of parallel cut lines for cutting the mother plate along the first direction; and a cutting step of cutting the mother plate along the plurality of cut lines to take out the plate springs made of the fiber-reinforced resin.

According to the above method, as compared to a case where a plurality of plate springs are individually molded using the fiber-reinforced resin, the number of molding steps relative to the number of plate springs to be produced is reduced, and therefore, the producibility can be improved. Even if nonuniform portions are formed by molding at end portions of the mother plate, the end portions being located in a direction orthogonal to a direction in which the cut lines extend, the positions of the cut lines are determined such that those end portions are not utilized as the plate spring. With this, the performance, life, and the like of the plate spring made of the fiber-reinforced resin can be improved. The continuous fibers oriented in the first direction when viewed from the normal direction of the main surface of the mother plate are used, and the mother plate is cut along the first direction. Therefore, the fibers on a cut surface are prevented from becoming nonuniform, and influences on the reinforced fibers by the cutting can be adequately suppressed.

Advantageous Effects of Invention

According to the present invention, the producibility of the plate spring made of the fiber-reinforced resin can be improved, and the performance, life, and the like of the plate spring can be improved.

DESCRIPTION OF EMBODIMENTS

Hereinafter, embodiments will be explained in reference to the drawings.

First Embodiment

Figure 1:
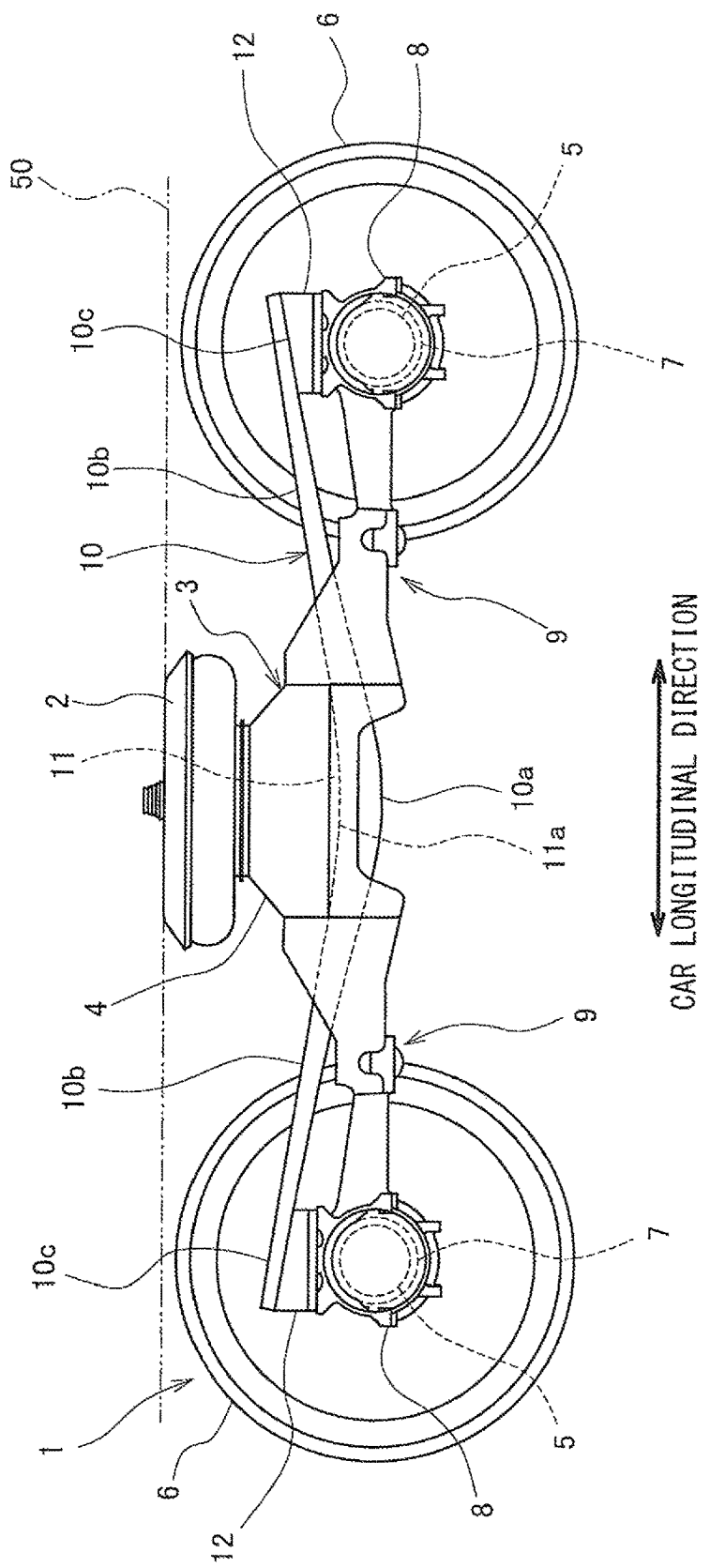
FIG. 1 is a side view showing a railcar bogie including a plate spring according to a first embodiment.

FIG. 1 is a side view showing a railcar bogie 1 including a plate spring according to the first embodiment. As shown in FIG. 1, the railcar bogie 1 includes a bogie frame 3 supporting a carbody 50 through an air spring 2 that is a secondary suspension. The bogie frame 3 includes a cross beam 4 extending in a car width direction that is a leftward/rightward direction. However, the bogie frame 3 does not include side sills extending from both respective car width direction end portions of the cross beam 4 in a car longitudinal direction that is a forward/rearward direction. The air spring 2 is provided on an upper surface of the cross beam 4. A pair of front and rear axles 5 are provided in front of and behind the cross beam 4, respectively, so as to extend in the car width direction. Wheels 6 are fixed to both respective car width direction sides of each of the axles 5. A bearing 7 rotatably supporting the axle 5 is provided at each of the car width direction end portions of the axles 5 so as to be located outside the wheel 6 in the car width direction. The bearings 7 are accommodated in respective axle boxes 8. Both car width direction end portions of the cross beam 4 are coupled to the axle boxes 8 through axle beam type coupling mechanisms 9. A plate spring 10 extending in the car longitudinal direction is provided between the cross beam 4 and the axle box 8. Longitudinal direction middle portions 10a of the plate springs 10 elastically support both respective car width direction end portions of the cross beam 4 from below, and the longitudinal direction end portions 10c of the plate springs 10 are supported by the respective axle boxes 8. To be specific, the plate spring 10 serves as both a primary suspension and a conventional side sill.

A contact member 11 having a circular-arc lower surface 11a is provided under each of the car width direction end portions of the cross beam 4. The contact member 11 is placed on and freely contacts the longitudinal direction middle portion 10a of the plate spring 10 from above. To be specific, the contact member 11 contacts an upper surface of the plate spring 10 by a downward load applied from the cross beam 4 by gravity, so as not to fix the plate spring 10 in the upward/downward direction. Supporting members 12 are attached to upper end portions of the respective axle boxes 8. Both longitudinal direction end portions 10c of the plate spring 10 are supported by the axle boxes 8 from below through the supporting members 12. The longitudinal direction end portion 10c of the plate spring 10 is placed on the supporting member 12 from above to freely contact an upper surface of the supporting member 12 by a downward load applied from the plate spring 10. An extending portion 10b between the longitudinal direction middle portion 10a and longitudinal direction end portion 10c of the plate spring 10 is inclined downward toward the longitudinal direction middle portion 10a in a side view. The longitudinal direction middle portion 10a of the plate spring 10 is located lower than the longitudinal direction end portion 10c of the plate spring 10. To be specific, the plate spring 10 is formed in a bow shape that is convex downward as a whole in a side view. The plate spring 10 is formed so as to gradually increase in thickness from the longitudinal direction end portion 10c toward the longitudinal direction middle portion.

Figure 2:
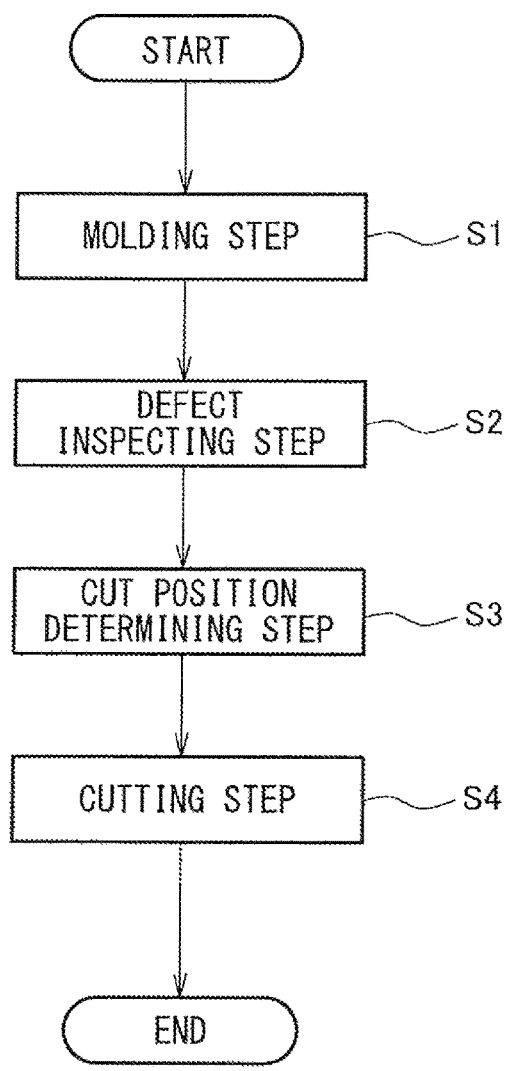
FIG. 2 is a flow chart for explaining a production procedure of the plate spring shown in FIG. 1.
Figure 3:
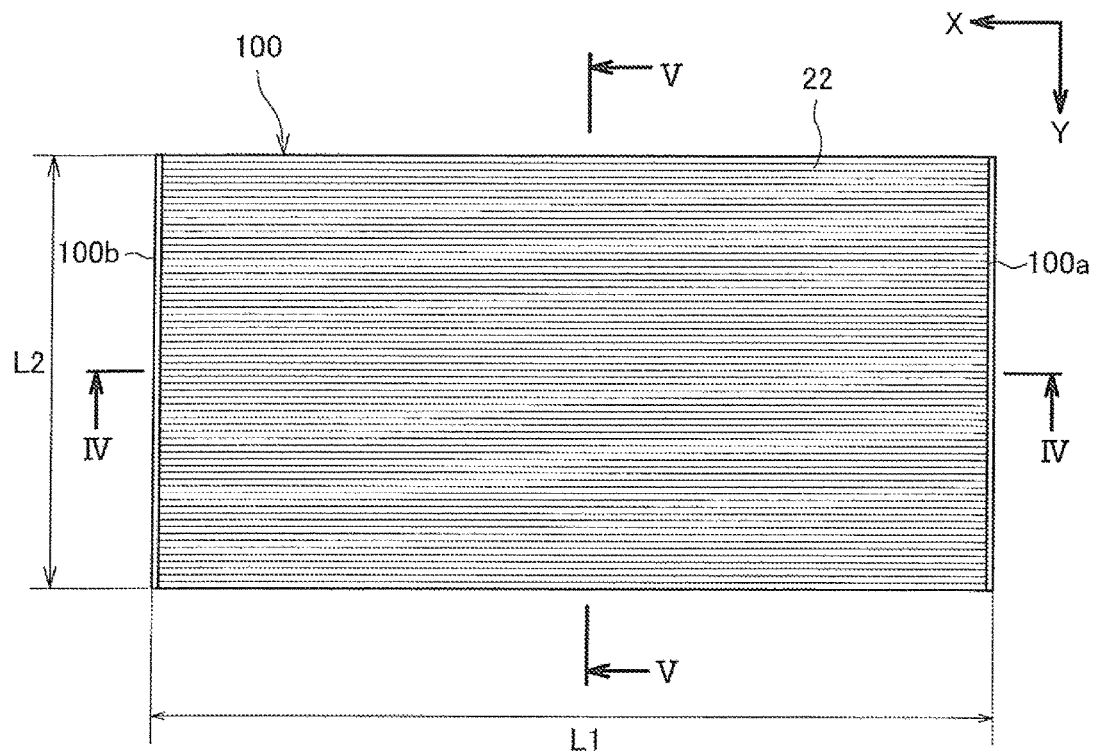
FIG. 3 is a plan view showing a mother plate molded in a molding step.
Figure 4:
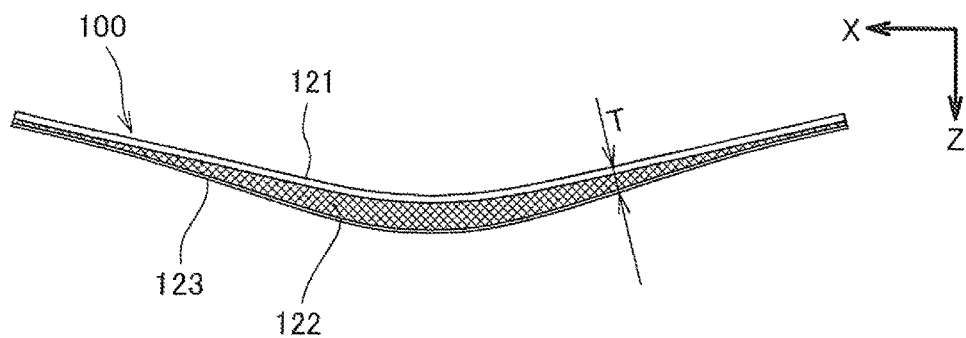
FIG. 4 is a cross-sectional view taken along line IV-IV of FIG. 3.
Figure 5:
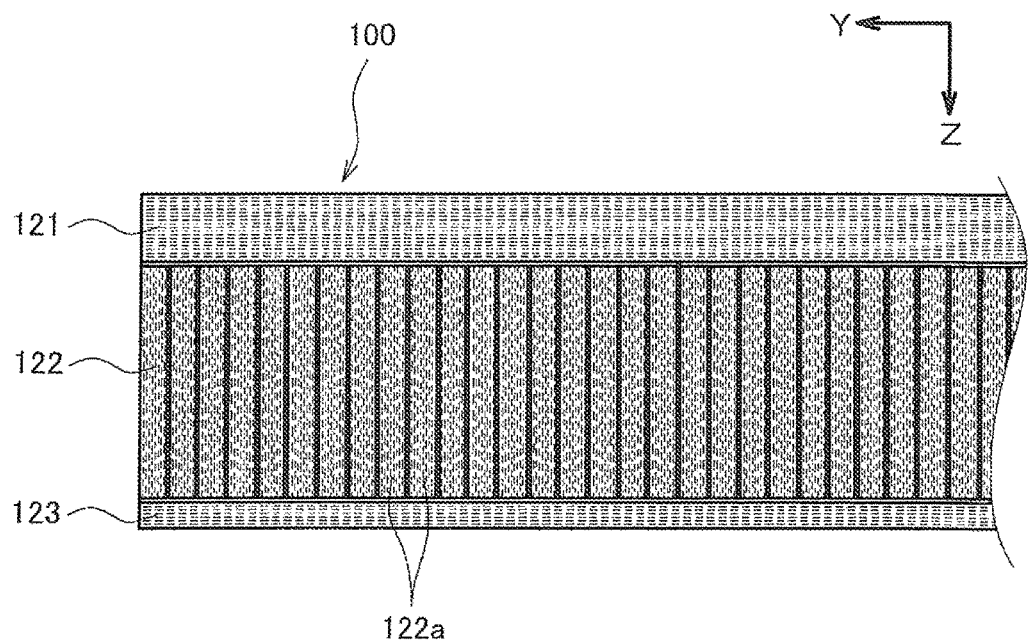
FIG. 5 is a cross-sectional view taken along line V-V of FIG. 3.
Figure 6:
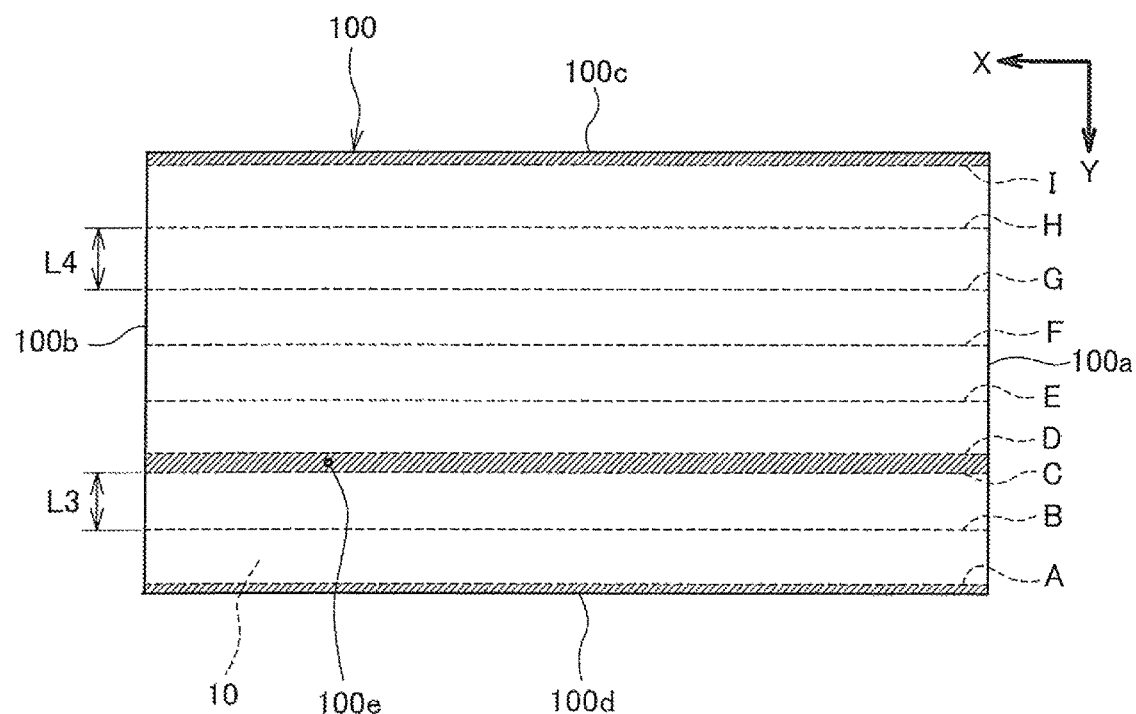
FIG. 6 is a plan view showing the mother plate and shows one example of cut lines determined in a cut position determining step.

Next, a production procedure for the plate spring 10 used in the bogie 1 will be explained in reference to the drawings. FIG. 2 is a flow chart for explaining the production procedure for the plate spring 10 shown in FIG. 1. FIG. 3 is a plan view showing a mother plate molded in a molding step. FIG. 4 is a cross-sectional view taken along line IV-IV of FIG. 3. FIG. 5 is a cross-sectional view taken along line V-V of FIG. 3. FIG. 6 is a plan view showing the mother plate and shows one example of cut lines determined in a cut position determining step. As shown in FIGS. 2 to 4, first, in a molding step, a mother plate 100 made of fiber-reinforced resin is molded by a molding method, such as an autoclave molding method, using a die (Step S1).

The mother plate 100 has a rectangular shape in a plan view. A direction along one side of the mother plate 100 is defined as an X direction (first direction), and a direction along another side of the mother plate 100 is defined as a Y direction (see FIG. 3). A length of the mother plate 100 in the X direction is substantially the same as a length L1 (see FIG. 7) of the plate spring 10 (finished product) in the car longitudinal direction. A length L2 of the mother plate 100 in the Y direction is twice larger than a length L3 (see FIGS. 6 and 7) of the plate spring 10 (finished product) in a width direction orthogonal to the car longitudinal direction, and preferably three times larger than the length L3. When viewed from the Y direction in a side view, the mother plate 100 is formed in a bow shape that is convex downward as a whole.

The mother plate 100 includes an upper layer 121, an intermediate layer 122, and a lower layer 123 and is formed by compounding different types of fiber-reinforced resins. For example, the upper layer 121 and the lower layer 123 are made of CFRP, and the intermediate layer 122 (core layer) is made of GFRP. Adhesives are interposed between the layers 121 and 122 and between the layers 122 and 123. The mother plate 100 is formed so as to gradually increase in thickness from an X direction end portion of the mother plate 100 toward an X direction middle portion of the mother plate 100. Specifically, the intermediate layer 122 is formed so as to gradually increase in thickness from an X direction end portion of the intermediate layer 122 toward an X direction middle portion of the intermediate layer 122, and the thickness of the upper layer 121 and the thickness of the lower layer 123 are constant. The shape of a cross section, orthogonal to the Y direction, of the mother plate 100 (i.e., the shape shown in FIG. 4) is the same at any position in the Y direction.

The intermediate layer 122 is formed in such a manner that: each of prepregs is formed by impregnating a reinforced fiber sheet (a glass fiber sheet, for example) with resin; the prepregs are stacked in the Y direction and pressed and heated to form each of a plurality of FRP plates 122a (each having a thickness of 30 mm, for example); and the FRP plates 122a are stacked in the Y direction and adhered to one another. The intermediate layer 122 includes, as reinforced fibers, continuous fibers extending along a plane orthogonal to the Y direction and oriented in two directions crossing each other in the plane. Therefore, when viewed from a normal direction of a main surface of the mother plate 100 (for example, a Z direction in FIGS. 3 and 4), the reinforced fibers of the intermediate layer 122 are the continuous fibers oriented in the X direction.

Each of the upper layer 121 and the lower layer 123 is formed in such a manner that: each of prepregs is formed by impregnating a reinforced fiber sheet (a carbon fiber sheet, for example) with resin; and the prepregs are stacked in the Z direction and pressed and heated. Each of the upper layer 121 and the lower layer 123 includes, as the reinforced fibers, continuous fibers continuously extending along the main surface of the mother plate 100 from an X direction end portion 100a of the mother plate 100 to an X direction end portion 100b of the mother plate 100 in the X direction. Therefore, when viewed from the normal direction (for example, the Z direction in FIGS. 3 and 4) of the main surface of the mother plate 100, the reinforced fibers of the upper layer 121 and the lower layer 123 are also the continuous fibers oriented in the X direction.

To maintain the reinforced fibers of the prepregs in a sheet shape, the layers 121 to 123 contain auxiliary fibers extending in a direction different from the direction in which the above reinforced fibers extend. A mass percentage of the auxiliary fibers with respect to the reinforced fibers in the mother plate 100 is less than 20%. The layers 121 to 123 do not contain short fibers as the reinforced fibers.

Next, as shown in FIG. 6, in a defect inspecting step, a known nondestructive inspection device inspects an internal defect (for example, an air bubble and an adhesive failure) and the like of the mother plate 100 to specify the position of a defect portion 100e of the mother plate 100 (Step S2). Next, in a cut position determining step, the positions of a plurality of parallel cut lines A to I for cutting the mother plate 100 in the X direction are determined (Step S3). Y direction end portions 100c and 100d of the mother plate 100 are not utilized as the plate springs 10. Therefore, the positions of the cut lines A and I are determined such that the end portions 100c and 100d each having a smaller width than the plate spring 10 are cut off. Further, the defect portion 100e specified in the defect inspecting step is not utilized as the plate spring 10. Therefore, the positions of the cut lines C and D are determined such that the defect portion 100e is excluded from a region of the mother plate 100, the plate springs 10 being taken out from the region of the mother plate 100. To be specific, portions shown by hatching in FIG. 6 are specified as regions which cannot be utilized as the plate spring.

The Y direction positions of the cut lines A to I are comprehensively determined such that the parallel plate springs 100 can be taken out from the remaining utilizable regions. At this time, if there is a request of taking out the plate springs having different spring constants, the Y direction positions of the cut lines A to I may be determined such that the lengths L3 and L4 (widths) of the plate springs 10 in the Y direction differ from each other. Lastly, in a cutting step, a cutting device (for example, a diamond cutter) cuts the mother plate 100 along the cut lines A to I to take out the plate springs 10 made of the fiber-reinforced resin (Step S4). At this time, the X direction end portions 100a and 100b of the mother plate 100 are used as the plate springs 10 without being cut off. After the cutting step, a molding step using a die is not performed. However, the X direction end portions 100a and 100b may be worked depending on the shape of the plate spring. As above, a plurality of plate springs 10 are taken out from the large mother plate 100 made of the fiber-reinforced resin. Therefore, as compared to a case where a plurality of plate springs 10 are individually molded using the fiber-reinforced resin, the number of molding steps relative to the number of plate springs 10 to be produced are reduced, and therefore, the producibility is improved (in the example shown in FIG. 6, seven plate springs are produced by one molding step).

Figure 7:
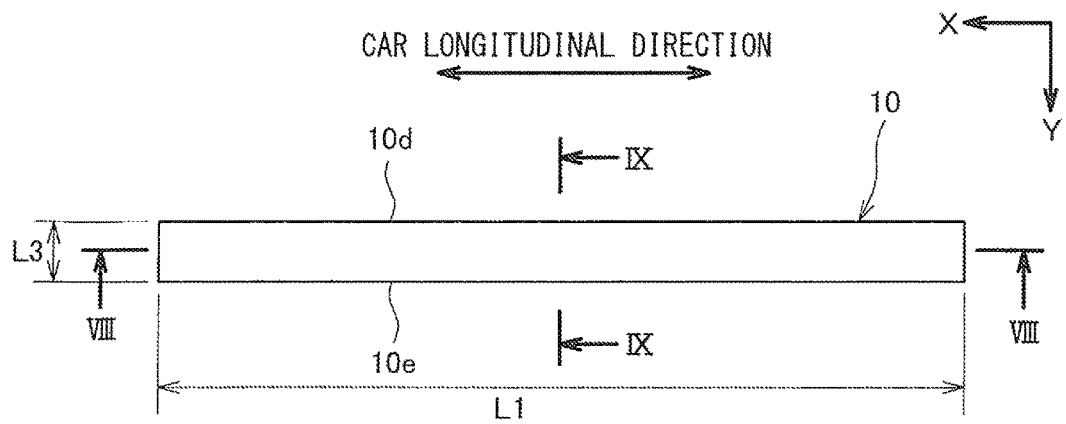
FIG. 7 is a plan view showing the plate spring taken out from the mother plate in a cutting step.
Figure 8:
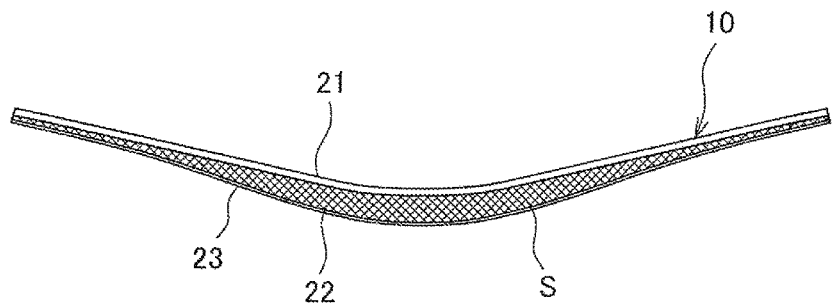
FIG. 8 is a cross-sectional view taken along line VIII-VIII of FIG. 7.
Figure 9:
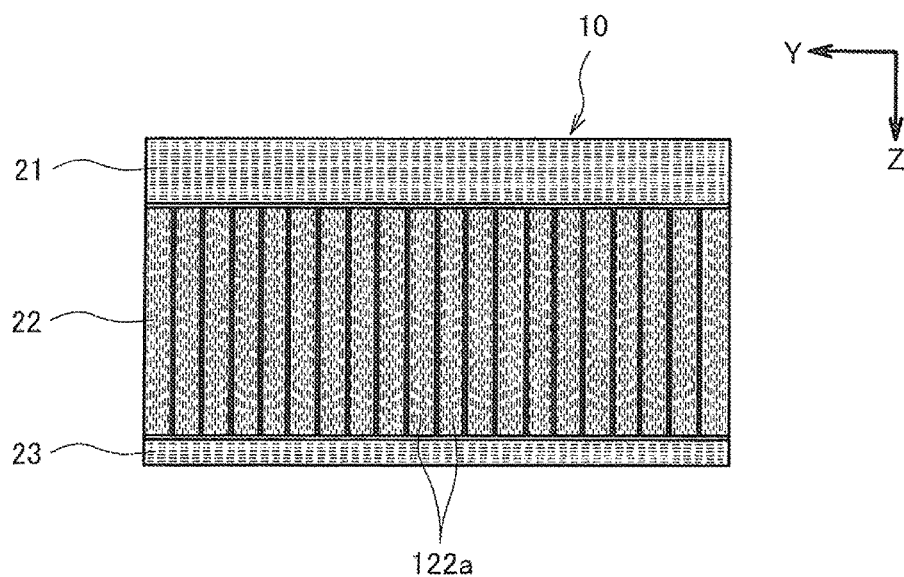
FIG. 9 is a cross-sectional view taken along line IX-IX of FIG. 7.

FIG. 7 is a plan view showing the plate spring 10 taken out from the mother plate 100 in the cutting step. FIG. 8 is a cross-sectional view taken along line XIII-XIII of FIG. 7. FIG. 9 is a cross-sectional view taken along line IX-IX of FIG. 7. As shown in FIGS. 7 to 9, the plate spring 10 obtained by the above steps (S1 to S4) includes an upper layer 21, an intermediate layer 22, and a lower layer 23. The upper layer 21, intermediate layer 22, and lower layer 23 of the plate spring 10 have the same properties as the upper layer 121, intermediate layer 122, and lower layer 123 of the mother plate 100, respectively. When viewed from the Z direction, the continuous fibers of the mother plate 100 are oriented in the X direction that is the same as a direction in which the cut lines A to I extend, and the continuous fibers of the mother plate 100 extend parallel to a cut surface S (FIG. 8). Therefore, as compared to a case where the short fibers are used, the fibers do not become nonuniform on the cut surface S, and influences on the reinforced fibers by the cutting can be adequately suppressed at width direction end portions 10d and 10e of the plate spring 10.

The end portions 100c and 100d (FIG. 6) where the fibers tend to become nonuniform are not used as the plate spring 10, and the defect portion 100e is also excluded. Therefore, the performance, life, and the like of the plate spring 10 made of the fiber-reinforced resin are improved. In the present embodiment, the X direction end portions 100a and 100b of the mother plate 100 are used as the plate springs 10 without being cut off. The longitudinal direction end portion of the plate spring 10 is a portion which is supported by the supporting member 12 when the plate spring 10 is mounted on the bogie 1 and does not perform a spring function. Therefore, while maintaining the excellent spring performance of the plate spring 10, man-hours for the cutting step can be cut. The longitudinal direction end portions of the plate spring 10 may be worked such that, for example, an attaching member or the other member is provided at the longitudinal direction end portion of the plate spring 10, the attaching member being used to attach the longitudinal direction end portion of the plate spring 10 to the supporting member 12.

Second Embodiment

Figure 10:
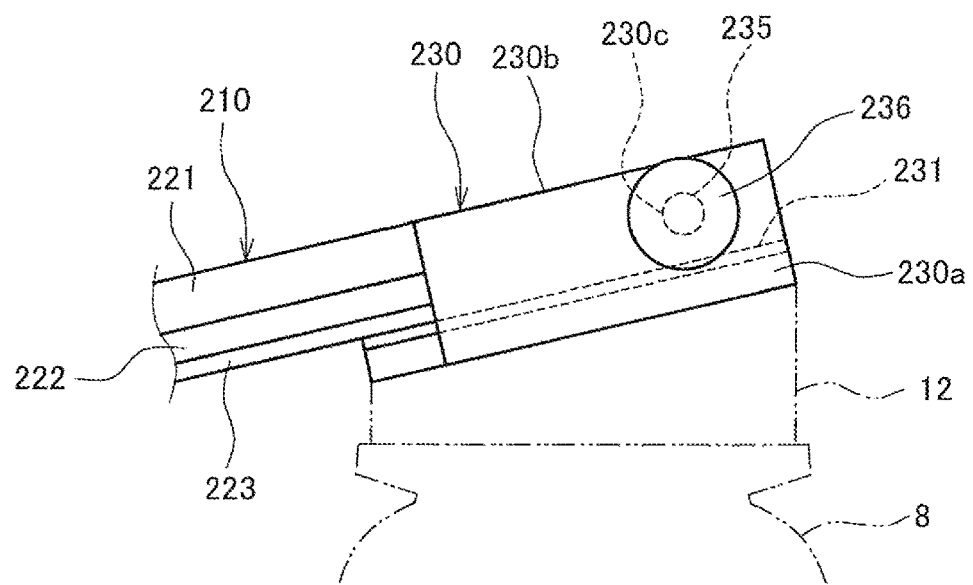
FIG. 10 is a side view showing major components of the railcar bogie including the plate spring according to a second embodiment.
Figure 11:
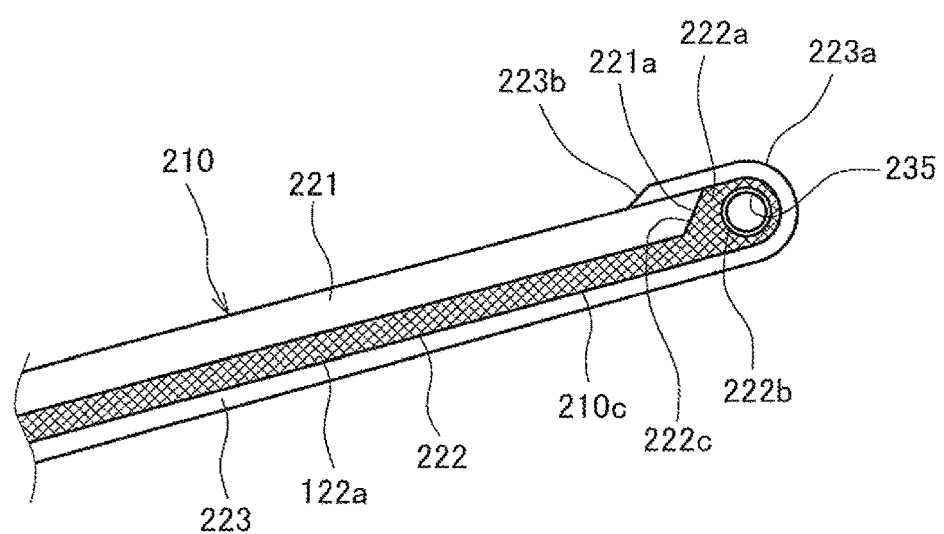
FIG. 11 is a longitudinal sectional view showing the major components of the plate spring shown in FIG. 10.

FIG. 10 is a side view showing major components of the railcar bogie including a plate spring 210 according to the second embodiment. FIG. 11 is a longitudinal sectional view showing the major components of the plate spring 210 shown in FIG. 10. As shown in FIGS. 10 and 11, a positioning member (for example, a metal pin 235) which is restricted to move relative to the axle box 8 in a horizontal direction is inserted at a longitudinal direction end portion 210c of the plate spring 210 of the present embodiment. With this, the movement of the plate spring 210 relative to the axle box 8 in the longitudinal direction is restricted by the pin 235. Thus, the positional displacement of the plate spring 210 in the longitudinal direction can be prevented.

Specifically, the longitudinal direction end portion 210c of the plate spring 210 is supported by the supporting member 12 from below through a spring seat 230, the supporting member 12 being attached to an upper end portion of the axle box 8. The relative movements of the spring seat 230 and the supporting member 12 in the horizontal direction are restricted by using, for example, a concave-convex fitting structure. The spring seat 230 includes: a bottom wall portion 230a placed on the supporting member 12; and a pair of left and right side wall portions 230b projecting upward from both respective car width direction sides of the bottom wall portion 230a. A rubber plate 231 is interposed between the plate spring 210 and the bottom wall portion 230a.

The plate spring 210 includes a plurality of layers 221 to 223 made of fiber-reinforced resin, and the pin 235 penetrates a longitudinal direction end portion 222a of the layer 222. A longitudinal direction end portion 223a of the layer 223 is folded back and bent so as to wind around the end portion 222a of the layer 222, the pin 235 penetrating the layer 222. More specifically, the plate spring 210 includes an upper layer 221, an intermediate layer 222, and a lower layer 223 and is formed by compounding different types of fiber-reinforced resin. In the present embodiment, the upper layer 221 and the lower layer 223 are made of CFRP, and the intermediate layer 222 is made of GFRP. Adhesives are interposed between the layers 221 and 222 and between the layers 222 and 223.

The intermediate layer 222 is formed in such a manner that: each of prepregs is formed by impregnating a glass fiber sheet with resin; the prepregs are stacked in the Y direction (see FIG. 9) and pressed and heated to form each of a plurality of FRP plates 122a (see FIG. 9); and the FRP plates 122a are stacked in the Y direction and adhered to one another. The intermediate layer 222 includes, as reinforced fibers, continuous fibers extending along a plane orthogonal to the Y direction and oriented in two directions crossing each other in the plane. The longitudinal direction end portion 222a of the intermediate layer 222 is thicker than the other portion of the intermediate layer 222. A through hole 222a is formed on the longitudinal direction end portion 222a of the intermediate layer 222 so as to open in the Y direction (see FIG. 9), and the pin 235 penetrates the through hole 222a.

Each of the FRP plates 122a is formed by cutting an FRP flat plate into a predetermined shape. When cutting the FRP flat plate, the through hole 222a through which the pin 235 is inserted is also formed. The FRP plates 122a are stacked on one another in the Y direction (see FIG. 9), and the pin 235 is inserted through the through holes 222a of the stacked FRP plates 122a, the through holes 222a communicating with one another. In this state, the FRP plates 122a and the pin 235 are adhered to one another. Since the pin 235 penetrates the through holes 222a of the FRP plates 122a, the pin 235 also serves as a positioning guide when the FRP plates 122a are adhered to one another. With this, the pin 235 and the intermediate layer 222 are adhered to each other, so that the wear of the intermediate layer 222 by rubbing of the intermediate layer 222 against the pin 235 is prevented. A length of the pin 235 is longer than a width of the plate spring 210 in the Y direction (see FIG. 9).

The end portion 222a of the intermediate layer 222 projects upward to be thick. The upper layer 221 is shorter than the intermediate layer 222 in the longitudinal direction. The end portion 222a of the intermediate layer 222 faces and is adhered to a longitudinal direction end surface 221a of the upper layer 221. Each of the longitudinal direction end surface 221a of the upper layer 221 and a surface 222c of the end portion 222a of the intermediate layer 222 is a tapered surface, the surface 221c facing the longitudinal direction end surface 221a. That is, as each of the surfaces 221a and 222c extends upward, each of the surfaces 221a and 222c extends outward in the longitudinal direction. A thickness of the end portion 222a of the intermediate layer 222 is equal to a sum of a thickness of the upper layer 221 and a thickness of the intermediate layer 222 located at a position on which the upper layer 221 is stacked (i.e., a thickness of a portion other than the end portion 222a).

The end portion 223a of the lower layer 223 is longer than the intermediate layer 222 in the longitudinal direction and is fold back and bent so as to wind around the end portion 222a of the intermediate layer 222. With this, the end portion 222a at which the through hole 222b is formed is reinforced by the end portion 223a of the lower layer 223. A longitudinal direction end surface of the intermediate layer 222 has a circular-arc shape in a side view. The end portion 223a of the lower layer 223 extends through an upper surface of the end portion 222a of the intermediate layer 222 to an upper surface of the upper layer 221. A tip end surface 223b of the end portion 223a of the lower layer 223 is a tapered surface. That is, as the tip end surface 223b extends upward, the tip end surface 223b extends outward in the longitudinal direction. Each of the upper layer 221 and the lower layer 223 is formed in such a manner that: each of prepregs is formed by impregnating a carbon fiber sheet with resin; and the prepregs are stacked in the Z direction (see FIG. 9) and pressed and heated. Each of the upper layer 221 and the lower layer 223 includes, as reinforced fibers, continuous fibers continuously extending from one end of the layer to the other end of the layer in the longitudinal direction. The pin 235 of the plate spring 210 is inserted through through holes 230c formed on the respective left and right side wall portions 230b of the spring seat 230, and head portions 236 each larger than the through hole 230c are connected to both respective ends of the pin 235. Thus, the pin 235 is prevented from coming off from the through holes 230c. Since the other components of the second embodiment are the same as the components of the first embodiment, explanations thereof are omitted.

When producing the plate spring 210, the same procedure as the first embodiment can be utilized. To be specific, the mother plate is molded such that a cross-sectional shape of the X direction (see FIG. 3) end portion of the mother plate becomes the same as a cross-sectional shape of the plate spring 210 shown in FIG. 11. Then, the mother plate is cut along the X direction. Thus, a plurality of plate springs 210 can be taken out.

In the above embodiment, instead of the pin 235, for example, a metal pipe may be inserted through the through hole 222a. In this case, the pin 235 is inserted into the pipe. With this, the metal pin 235 and the metal pipe contact each other, so that the fiber-reinforced resin and the metal do not contact each other. Thus, the wear can be prevented.

In the above embodiment, the head portions 236 are connected to both respective end portions of the pin 235. However, the pin 235 may be configured integrally with flanges.

The present invention is not limited to the above embodiments. Modifications, additions, and eliminations may be made within the scope of the present invention. In the above embodiment, the plate spring obtained by the cutting step is utilized in the bogie as it is. However, a step of polishing the surface of the plate spring may be performed after the cutting step. The molding method in the molding step is not especially limited as long as the fiber-reinforced resin can be formed into a desired shape. Therefore, various molding methods may be used.

INDUSTRIAL APPLICABILITY

As above, the method of producing the plate spring for the railcar bogie according to the present invention has excellent effects of improving the producibility of the plate spring made of the fiber-reinforced resin and improving the performance, life, and the like of the plate spring. Therefore, it is useful to widely apply this method to the railcar bogies which can achieve the significance of these effects.

REFERENCE SIGNS LIST 1 bogie
5 axle
7 bearing
8 axle box
10, 210 plate spring
100 mother plate

The invention claimed is:

1. A method of producing plate springs for a railcar bogie, the plate springs each extending in a car longitudinal direction and elastically supporting a cross beam while being supported by an axle box in the railcar bogie, the axle box accommodating a bearing for an axle, the method comprising:

a molding step of molding a mother plate made of fiber-reinforced resin by using a die, the mother plate including a layer made of continuous fibers oriented in a first direction when viewed from a normal direction of a main surface of the mother plate;

a cut position determining step of determining positions of a plurality of parallel cut lines for cutting the mother plate along the first direction, including end portions of the mother plate, each end portion having a smaller width than the plate spring and the end portions being located on the mother plate in a direction orthogonal to the first direction, the cut position determining step performed after the molding step; and a cutting step of cutting the mother plate along the plurality of cut lines to take out the plate springs made of the fiber-reinforced resin and the end portions.

2. The method according to claim 1, further comprising a defect inspecting step of inspecting the mother plate to specify a position of a defect portion, wherein in the cut position determining step, the positions of the plurality of cut lines are determined such that the specified position of the defect portion is excluded from a region of the mother plate, the plate springs being taken out from the region of the mother plate.

3. The method according to claim 1, wherein in the cut position determining step, the positions of the plurality of cut lines are determined such that widths of the plate springs taken out in the cutting step differ from one another.

* * * * *